Oct. 6, 1931. C. W. ACKERBERG 1,826,338
PERSPECTOGRAPH
Filed March 25, 1930 3 Sheets-Sheet 1

INVENTOR
CARL W. ACKERBERG
BY Arthur L. Slee
ATTY.

Oct. 6, 1931.     C. W. ACKERBERG     1,826,338
PERSPECTOGRAPH
Filed March 25, 1930     3 Sheets-Sheet 2
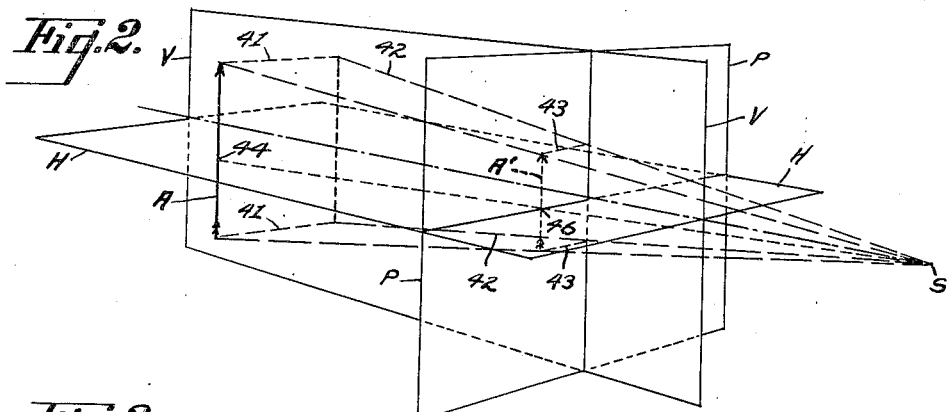
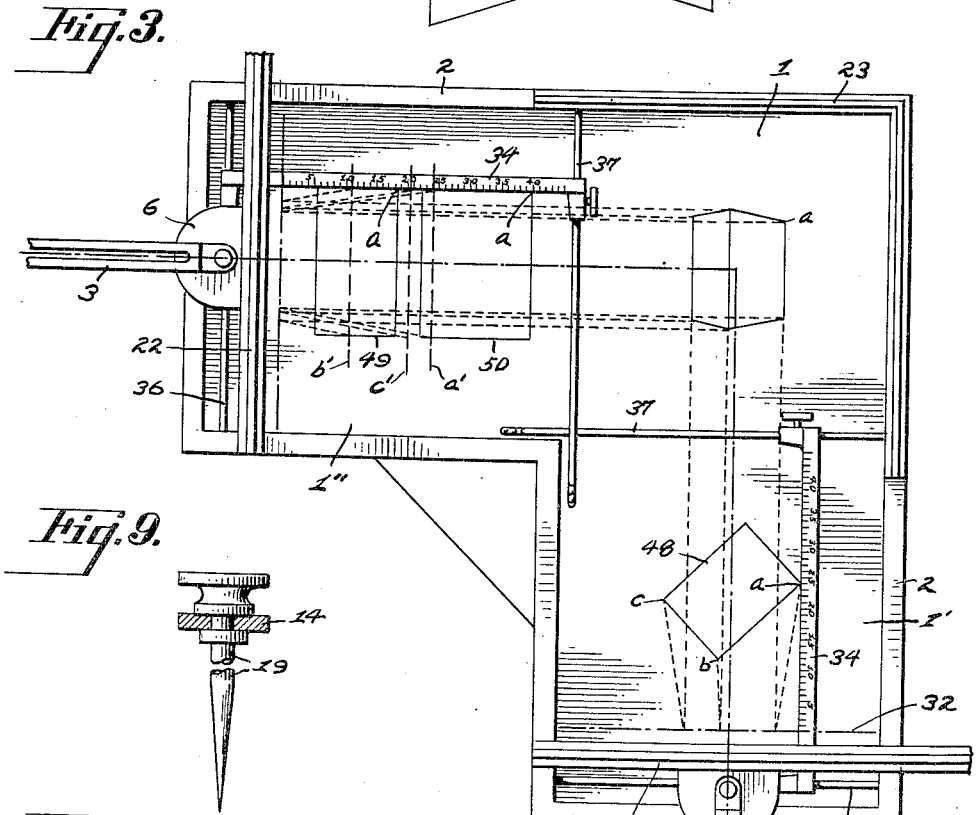
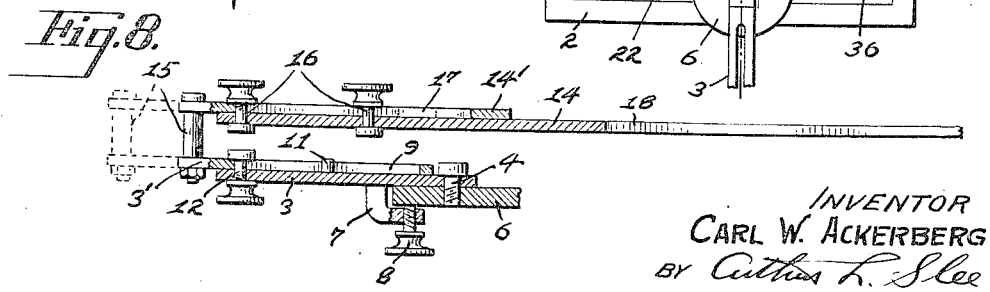
INVENTOR
CARL W. ACKERBERG
BY Arthur L. Slee
ATTY.

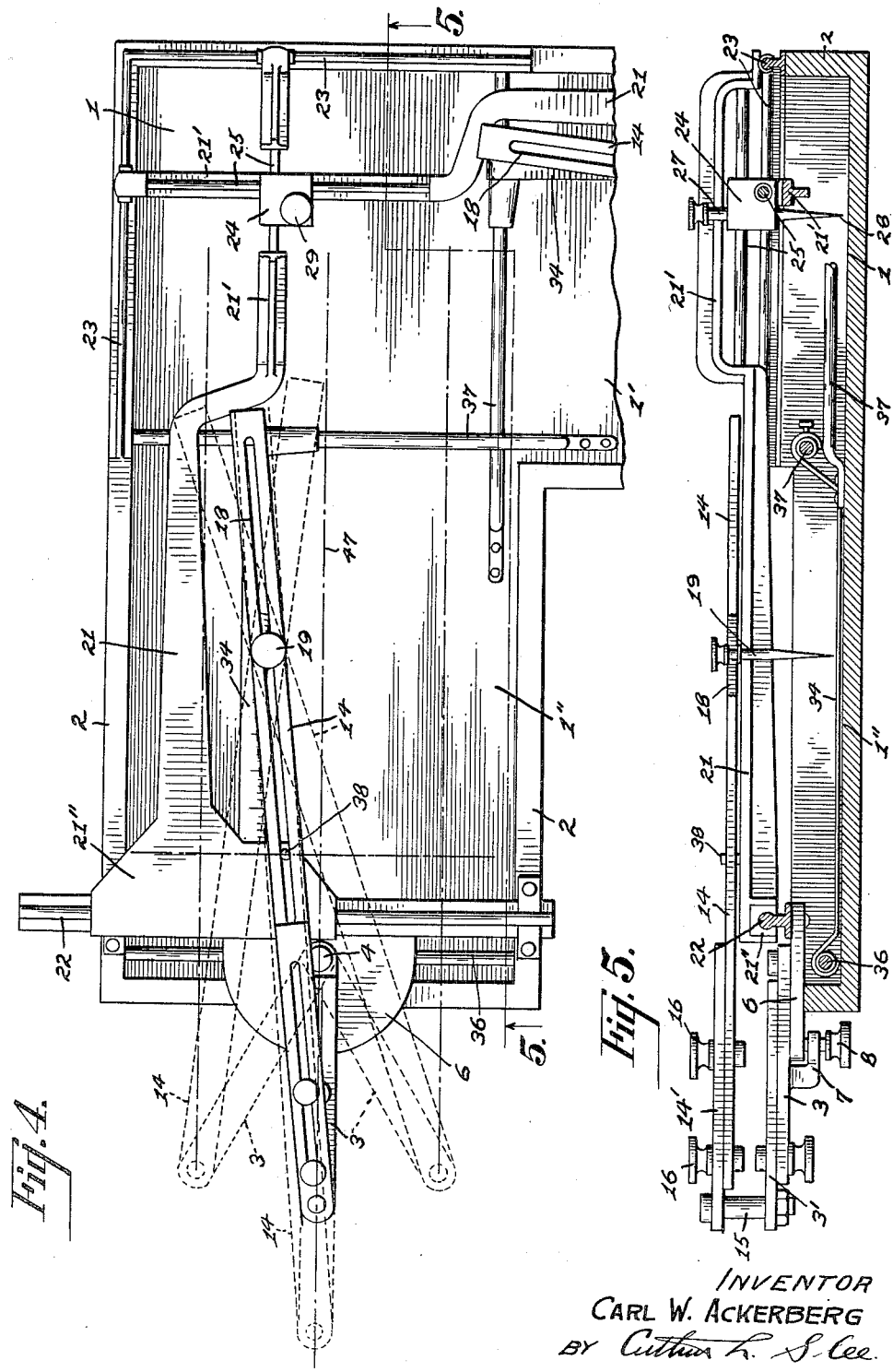

Patented Oct. 6, 1931

1,826,338

UNITED STATES PATENT OFFICE

CARL W. ACKERBERG, OF SAN FRANCISCO, CALIFORNIA

PERSPECTOGRAPH

Application filed March 25, 1930. Serial No. 438,774.

My invention relates to improvements in perspectographs wherein arms are pivotally mounted upon station points and arranged to be moved to project desired points of elevation views onto lines representing the intersection of horizontal and vertical planes of vision with a perspective picture plane, said arms being connected to members actuated by said arms to project the projections of said points in orthographic projection onto the picture plane to locate the position of said points in the perspective view.

The primary object of my invention is to provide an improved perspectograph for drawing perspective views.

Another object is to provide an improved device provided with mechanism for mechanically projecting the points of elevation views to locate said points in true perspective relation upon a picture plane.

A further object is to provide an improved mechanism wherein the projections of points upon horizontal and vertical vision planes are automatically projected in orthographic projection onto the picture plane.

Another object is to provide an improved device of the character described provided with means for coordinating points of different elevation views to locate said points in perspective.

A further object is to provide an improved perspectograph provided with station points adjustable to various positions to vary the horizon and the angle of vision.

A further object is to provide an improved mechanism of the character described wherein the operating elements are supported and guided in accurate relation to obtain an accurate and efficient operation.

A still further object is to provide an improved perspectograph of rugged and efficient construction and which is simple and efficient in operation.

I accomplish these and other objects by means of the improved device disclosed in the drawings forming a part of the present application wherein like characters of reference are used to designate similar parts throughout the specification and drawings, and in which— the theory of operation of my improved perspectograph;

Fig. 2 is a diagrammatic view illustrating the theory of operation of my improved perspectograph;

Fig. 3 is a plan view of the device with the projecting members removed to show the operation of the scales to coordinate points to be projected;

Fig. 4 is a broken plan view of the device showing the manner in which the station points may be adjusted, the figure being drawn upon a larger scale;

Fig. 5 is a transverse section taken upon the line 5—5 of Fig. 4 in the direction indicated;

Fig. 8 is a broken sectional detail showing the structure and mounting of a station arm and perspective arm mounted thereon; and Fig. 9 is a broken detail of a projecting pointer as mounted upon a perspective arm.

Figure 1:
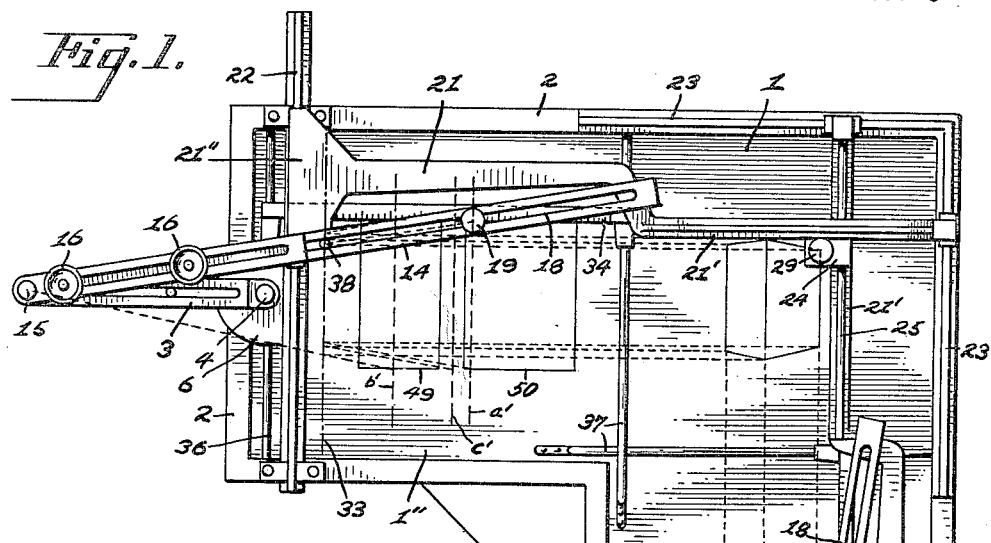
Figure 6:
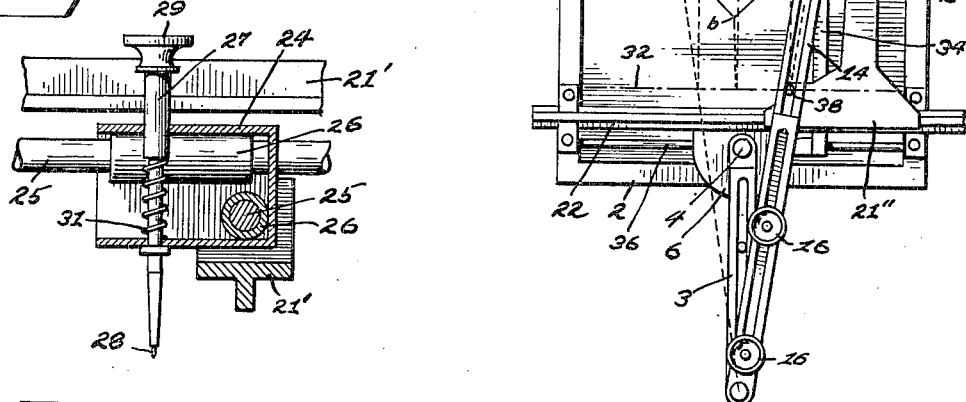
Fig. 6 is a broken sectional detail, drawn upon a larger scale, of the perspective pointer and its mounting.
Figure 7:
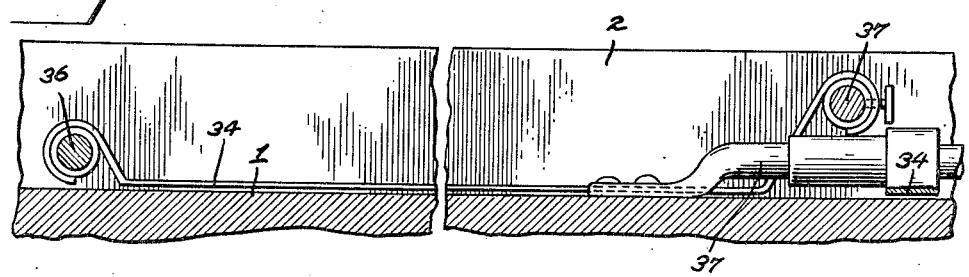
Fig. 7 is a broken sectional view, drawn upon a larger scale, showing the arrangement and mounting of the coordinating scales.

Referring to the drawings, the numeral 1 is used to designate in general a drawing surface preferably comprising a drawing board having a main body portion arranged to form an area to receive a perspective view to be drawn, and extensions 1' and 1" forming areas to receive elevation view of the object to be drawn in perspective. The drawing surface or board is preferably provided with a flange 2 extending upwardly around the edge.

A station point arm 3 is mounted upon the outer edge of each extension 1' and 1". The arms 3 are pivoted as at 4 upon sector plates 6 secured upon the outer edges of the extensions, each arm 3 being provided with an extension 7 extending downwardly and offset to extend under the edge of the adjacent plate 6. A suitable securing member 8 is mounted upon each extension 7 to detachably secure the arms 3 in desired angular adjustment as hereinafter more fully explained.

The arms 3 are preferably made extendible by means of arm portions 3' having slots 9 formed longitudinally therein to engage fixed pins 11, secured upon the main arm portions 3, and clamping members 12 operative to clamp the arm portions 3' in a desired position relative to the main portions 3, as best shown in Fig. 8 of the drawings.

A perspective projecting arm 14 is pivotally connected to each station arm 3 by means of a suitable pivot pin 15 secured upon the outer end of the arm 3 and forming what is hereinafter referred to as a station point. The arms 14 each consist of a main portion provided with clamping members 16 extending through a slot 17 formed in an extendible portion 14' whereby the arms 14 may be extended to conform to the adjustment of the station arms 3. The arms 14 are provided with longitudinally disposed slots 18 arranged to receive suitable pointers 19 slidably mounted within the slots and extending downwardly from the arms 14 into proximate relation to the surface of the drawing board. The arms 14 extend from the station points 15 over the portions 1' and 1'' of the drawing board, and the pointers 19 are slidably movable along said arms whereby the pointers may be moved to substantially any point upon the adjacent portion 1' or 1'' of the drawing surface.

An orthographic projecting member 21 is mounted to extend across the drawing board in association with each perspective projecting arm 14. The members 21 are slidably mounted upon guides 22 extending across the portions 1' and 1'' adjacent the outer edges thereof. The members 21 extend across said portions 1' and 1'' respectively and the main body portion 1 of the drawing board to slidably engage guides 23 secured upon the opposite edges of the drawing board. The members 21 are preferably formed of T-shaped cross section to obtain rigidity, and said members are provided with offset portions 21' opposite the main body portion 1 of the drawing board to provide clearance between the members 21 whereby the members may cross each other and each may be freely moved across the board without interference by the other.

The members 21 are provided with relatively long guide bearing portions 21'' engaging the guides 22 to insure rigid alinement of the members, and the guides 22 are made longitudinally adjustable to extend outwardly past either side of the board portions 1' or 1'' to accommodate said elongated bearing portions when the members 21 are to be moved to positions close to the edges of the drawing board.

Pointer guide rods 25 are mounted upon the members 21 to extend longitudinally across the offset portions 21' thereof, the rods 25 being positioned upon the adjacent sides of said members 21 and within said offset portions at right angles to each other. A pointer mounting member 24 is provided with bearing sleeves 26 arranged at right angles to each other, each of said sleeves being slidably mounted upon a rod 25 whereby the mounting member 24 is supported at the crossing point of the member 21 and rods 25. Each sleeve 26 is slidably movable along its guide rod 25 whereby the member 24 may be moved along either member 21 and rod 25 by a movement of the other member 21 and rod 25 to maintain a uniform relation of the member 24 to the crossing point of the members 21.

A pointer 27 is mounted upon the member 24. The pointer 27 comprises a body portion extending vertically through the member 24 and provided with a suitable marking point 28 upon its lower end and an actuating button 29 upon its upper end. The pointer is normally held with its point slightly elevated from the plane of the drawing surface 1 by a spring 31, the pointer being moved downwardly manually to mark desired points when desired.

Vision lines 32 and 33 are marked upon the surfaces of the portions 1' and 1'' of the drawing board, said lines being arranged near the outer edges of said drawing surface portions and at right angles relative to each other to represent the intersection of horizontal and vertical planes of vision with the plane of the perspective picture plane, as hereinafter more fully explained.

A pair of graduated scales 34 are slidably mounted to extend across the drawing surface portions 1' and 1''. The scales are slidably supported at one end upon guide rods 36 extending transversely across the surface portions 1' and 1'' adjacent the outer edges thereof, and the opposite ends of said scales are slidably supported upon guide rods 37 secured above the main drawing surface 1 and parallel to said rods 36. The rods 36 and 37 are elevated above the drawing surface, and the scales are offset to extend between the rods 36 and 37 in proximate relation to the drawing surface. The scales 34 are calibrated in any arbitrarily assumed units, the calibrations of both scales being the same and having the outermost calibration matching with the adjacent vision line 32 or 33.

The perspective arms 14 are connected to the orthographic projecting members 21 by means of pins 38 secured upon the upper surfaces of the members 21 and engaged within the slots 18 of the arms 14. The axis of each pin 38 is arranged directly opposite the marker point 28 of the pointer 27, said pins 38 being so arranged that lines drawn through the centers of the pins 38 and at right angles to the vision lines 32 and 33 will intersect at right angles at said marker point. The pins form an actuating connection between the arms 14 and the member 21 whereby a pivotal movement of the arms 14 will cause the members 21 to be moved to various positions along the guides 22 and 23.

The theory of operation of my improved perspectograph is best explained by reference to Fig. 2 of the drawings. In this figure I have assumed a picture plane P intersected at right angles by a horizontal plane of vision H and a vertical plane of vision V, the line of intersection of said horizontal and vertical planes being within the picture plane. Assuming any object in space, as the arrow A viewed from a point of vision or station point S located along the line of intersection of the planes H and V, the object will appear upon the picture plane P in the size and position of the dotted arrow A', as a perspective projection of the arrow A.

The size and position of the projection upon the plane P may be obtained graphically by projecting the points of the arrow A in orthographic projection onto the vertical plane V as by the broken lines 41. The points thus projected onto the plane V are projected to the station point S by the broken lines 42 and the intersection of said lines 42 with the picture plane along its intersection with the vertical plane V will determine the positions of the points in said picture plane relative to the horizon. The intersections of the lines 42 with the picture plane may then be projected orthographically as by the broken lines 43 in their proper relation in the picture plane P. The position relative to the vertical plane is determined by projecting the arrow A onto the horizontal plane, as at the point 44. A line from the point 44 to the station point S intersects the picture plane P at the point 46 within the line of intersection of the plane H with the picture plane, and the orthographic projection of the point 47 intersects with the lines 43 to definitely determine the position of the points of the arrow A'.

In my improved mechanism, the vision lines 32 and 33 represent and correspond to the intersections of the horizontal and vertical planes H and V respectively with the picture plane of the perspective view to be made. The pivot pins 15 represent the position of the station point S in the horizontal and vertical planes H and V and are adjusted to equal distances from the lines 32 and 33. In this manner, the surface 1', with its line 32 and station point 15, corresponds to the horizontal plane, its intersection with the picture plane, and the station point S of the diagram of Fig. 2, and the surface 1", with its line 33 and station point 15, corresponds to the vertical plane V with its intersection and station point.

To draw a perspective view of any desired object, elevational views of the object are drawn or placed upon the surfaces 1' and 1" in a desired relation to the horizon, as represented by the center line 47. Assuming a rectilinear solid, as illustrated in Figs. 1 and 3 of the drawings, a plan, or horizontal elevation, 48 of the solid is drawn or placed in the desired position upon the surface 1'. Side and end elevations 49 and 50 of the solid are drawn or placed upon the surface 1" in any convenient position relative to each other. These elevation views represent the orthographic projection of the object upon the vertical and horizontal planes of vision.

To locate any desired point of the object in perspective upon the picture plane or surface 1, the pointer 19 of the arm 14 associated with the horizontal view area 1' is moved to the desired point in the plan view, the arm 14 being swung upon the pivot 15 into alinement with the desired point, and the pointer 19 being moved along the slot 18 to accurately indicate true alinement. The arm 14 defines the perspective projection of the point to the station point 15, and the intersection of the line of projection with the picture plane is marked by the pin 38 located at the point at which the center of the arm 14 crosses the line 32. As the arm 14 is swung to the desired position, the pin 38 is moved along the line 32 and the member 21 is correspondingly moved so that the pointer 27 is moved into alinement with the projected point and defines the line of horizontal projection onto the picture plane.

The other arm 14 is then moved into alinement with the corresponding point of the side or end elevations upon the surface 1". Unless the views 49 and 50 are placed in positions exactly corresponding to the angular position of the plan view 48, it is necessary to coordinate the points of the side or end elevations with the assumed position of the plan view. This is accomplished by means of the scales 34. The scale 34 associated with the surface 1' is moved to measure the distance between the desired point in the plan view 49 and the line 32. The other scale 34 is then moved into alinement with the desired point upon the side or end elevation views 49 or 50, and the pointer 19 is moved to a position along the edge of the scale at the calibration corresponding to the scale reading of the plan view point. The arm 14 then operates to project the point onto the line 33 at the intersection marked by the pin 38, and the member 21 is moved correspondingly to define the orthographic projection of said point onto the perspective picture plane 1, the pointer 27 being moved along the members 21 to a position marking the intersection of the orthographic projections onto the picture plane of the points as projected in perspective projection onto the lines 32 and 33.

To illustrate the coordinating of points in the plan and elevation views, let it be assumed that the point (a) represents an upper corner of the solid to be drawn in perspective. The scale reading of this point in the plan view 48, as shown in Fig. 3 of the drawings, is observed to be twenty-four. The scale 34 associated with the area 1" is moved into alinement with the corresponding upper corner, and the pointer 19 set at the edge of the scale opposite the calibration 24, thereby coordinating the distances along the horizontal and vertical planes of vision as represented by the surfaces 1' and 1". In coordinating the points $a$, $b$, and $c$, the positions of said points in the area 1" are determined by the scale reading to be located along the lines $a'$, $b'$ and $c'$ marking the rectilinear distance of said points from the intersection lines 32 and 33.

The several points of the object are located successively, by moving the arms 14 to successive points and thereby moving the members 21 and the pointer 27 to locate said points in perspective upon the picture plane 1, as indicated by the dotted projection lines in Figs. 1 and 3 of the drawings. The points are marked successively by the pointer 27 and when the required points have been located, lines are drawn between the points to obtain the desired perspective view upon the surface 1.

The angle of the perspective view and its relation to the normal horizon may be altered by varying the positions of the elevation views. Further variation may be obtained, and the angularity of the perspective may be altered by shifting station arms pivotally or extending said arms to vary the position of the station point 15, as indicated in Fig. 4 of the drawings, thus permitting the device to be adjusted to meet substantially any requirement. The station arms are also adjustable to angular positions to facilitate the projecting of points near the borders of the elevation view surfaces without causing the projecting members 21 to disengage their respective guides.

The station arms 3 are set in positions arbitrarily selected to meet the convenience of the operator and to obtain a desired positioning and angularity of the perspective view. The adjusting of each arm 3 is independent of the adjusting of the other arm 3, except that the distance between the station points and the pin 38 of said arms, as measured by the perpendicular distance from the station points to the vision lines 32 and 33 along which the pins 38 are movable, must be kept equal. Thus, if one arm 3 is shifted to an angular position, a corresponding adjustment must be made in the length of one or the other of the arms 3 so that the perpendicular distance from the line of movement of the pins 38 to the respective station points will be kept equal. This is necessary because the perpendicular distance from the station points to the line of movement of the pins 38 represents the distance from the perspective plane to the observation point and is the same in both the horizontal and vertical planes of vision.

While I have illustrated and described what I regard as the preferred embodiment of my invention, the specific details of construction and arrangement are subject to modification in a great number of ways without departing from the spirit of my invention. I therefore do not wish to be restricted to the specific structure shown, but desire to avail myself of all modifications which may fall within the scope of the appended claims.

Having thus described my invention, what I claim as new and desire to secure by Letters Patent is:

1. A perspectograph comprising a drawing surface having areas to receive elevation views of an object to be drawn in perspective and an area to receive a perspective view of said object; station points spaced from the drawing surface, one of said station points representing an observation point in a horizontal plane of vision and the other station point representing the same observation point within a vertical plane of vision; means for projecting points of the elevation views to the station points, the lines of projection intersecting vision lines representing the intersection of said horizontal and vertical planes of vision with the plane of the perspective drawing; and means for projecting the intersections upon the vision lines orthographically onto the perspective area to determine the positions of corresponding points in the perspective view.

2. A perspectograph comprising a drawing surface having areas to receive elevation views of an object to be drawn in perspective and an area to receive a perspective view of said object, and provided with vision lines representing the intersection of horizontal and vertical planes of vision intersecting at right angles with the plane of the perspective view; means for projecting points of the elevations in perspective projection onto the vision lines; and means for projecting the points along the vision lines in orthographic projection onto the plane of the perspective view to locate said points in the perspective area.

3. A perspectograph comprising a drawing surface having areas to receive elevation views of an object to be drawn in perspective and an area to receive a perspective view of said object, and provided with vision lines representing the intersection of horizontal and vertical planes intersecting at right angles with the plane of the perspective view; means for projecting points of the elevations in perspective projection onto the vision lines; and means connected to and actuated by the perspective projecting means to project the points from the vision lines in orthographic projection onto the plane of the perspective view to locate said points in the perspective area.

4. A perspectograph comprising a drawing surface having areas to receive elevation views of an object to be drawn in perspective and an area to receive a perspective view of said object, and provided with vision lines representing the intersection of horizontal and vertical planes of vision intersecting at right angles with the plane of the perspective view; arms pivoted at station points spaced from the vision lines to project points of the elevations in perspective projection onto the vision lines; and members slidably mounted adjacent to the drawing surface, said members being connected to and actuated by the arms for projecting the points from the vision lines in orthographic projection onto the plane of the perspective view to locate said points in the perspective area.

5. A perspectograph comprising a drawing surface having areas to receive elevation views of an object to be drawn in perspective and an area to receive a perspective view of said object, and provided with vision lines representing the intersections of horizontal and vertical planes of vision intersecting at right angles with the plane of the perspective view; a pair of arms pivoted at station points spaced from the vision lines to project points of the elevations in perspective projection onto the vision lines; and members connected to and actuated by the arms to project in orthographic projection the points from the vision lines onto the perspective area to locate said points in the perspective view.

6. A perspectograph comprising a drawing surface having areas to receive elevation views of an object to be drawn in perspective and an area to receive a perspective view of said object, and provided with vision lines representing the intersections of horizontal and vertical planes of vision intersecting at right angles with the plane of the perspective view; station points adjustably mounted adjacent to the drawing surface in spaced relation to the vision lines; a pair of arms pivoted at said station points to project points of the elevations in perspective projection onto the vision lines; and members connected to and actuated by the arms to project in orthographic projection the points from the vision lines onto the perspective area to locate said points in the perspective view.

7. A perspectograph comprising a drawing surface having areas to receive elevation views of an object to be drawn in perspective and an area to receive a perspective view of said object, and provided with vision lines representing the intersections of horizontal and vertical planes of vision intersecting at right angles with the plane of the perspective view; a pair of perspective arms pivotally mounted at station points spaced from the vision lines, said arms extending over the elevation areas of the drawing surface to project points of the elevations in perspective projection onto the vision lines; a pair of slidably mounted orthographic projecting arms each extending across one of the elevation areas of the perspective area; actuating means mounted upon each orthographic projecting arm directly above the adjacent vision line and engaged by the adjacent perspective arm for moving said orthographic projecting arms simultaneously with the perspective arms to project the points onto the perspective area to locate said points in the perspective view.

8. A perspectograph comprising a drawing surface having areas to receive elevation views of an object to be drawn in perspective and an area to receive a perspective view of said object, and provided with vision lines representing the intersections of horizontal and vertical planes representing the intersections of horizontal and vertical planes of vision intersecting at right angles with the plane of the perspective view; a pair of perspective arms pivotally mounted at station points spaced from the vision lines, said arms extending over the elevation areas of the drawing surface to project points of the elevations in perspective projection onto the vision lines; a pair of slidably mounted orthographic projecting arms each extending across one of the elevation areas of the perspective area; actuating means mounted upon each orthographic projecting arm directly above the adjacent vision line and engaged by the adjacent perspective arm for moving said orthographic projecting arms simultaneously with the perspective arms to project the points onto the perspective area to locate said points in the perspective view; and a pointer slidably connected to both orthographic projecting arms adjacent the crossing point thereof and alined with the actuating means of said arms to mark the intersection of the projections of points projected from the vision lines, to locate said points in the perspective view.

9. A perspectograph comprising a drawing surface having areas to receive elevation views of an object to be drawn in perspective and an area to receive a perspective view of said object, and provided with vision lines representing the intersections of horizontal and vertical planes of vision intersecting at right angles with the plane of the perspective view; a pair of perspective arms pivotally mounted at station points spaced from the vision lines, said arms extending over the elevation areas of the drawing surface to project points of the elevations in perspective projection onto the vision lines; a pair of slidably mounted orthographic projecting arms each extending across one of the elevation areas of the perspective area; actuating means mounted upon each orthographic projecting arm directly above the adjacent vision line and engaged by the adjacent perspective arm for moving said orthographic projecting arms simultaneously with the perspective arms to project the points onto the perspective area to locate said points in the perspective view; a pointer slidably connected to both orthographic projecting arms adjacent the crossing point thereof and alined with the actuating means of said arms to mark the intersection of the projections of points projected from the vision lines, to locate said points in the perspective view; and scales mounted adjacent the elevation surfaces for coordinating the positions of corresponding points of the elevation views.

10. A perspectograph comprising a drawing surface having areas to receive elevation views of an object to be drawn in perspective and an area to receive a perspective view of said object, and provided with vision lines representing the intersections of horizontal and vertical planes of vision intersecting at right angles with the plane of the perspective view; arms pivoted at station points spaced from the vision lines and provided with pointers adjustable along the arms for projecting points of the elevation views onto the vision lines; scales mounted adjacent the surfaces of the elevation areas for coordinating the positions of corresponding points of the elevation views relative to the vision lines; and projecting members connected to and actuated by the arms for projecting said points from the vision lines onto the perspective area.

11. A perspectograph comprising a drawing surface having areas to receive elevation views of an object to be drawn in perspective and an area to receive a perspective view of said object, and provided with vision lines representing the intersections of horizontal and vertical planes of vision intersecting at right angles with the plane of the perspective view; arms pivoted at station points spaced from the vision lines and provided with pointers adjustable along the arms for projecting points of the elevation views onto the vision lines; scales mounted adjacent the surfaces of the elevation areas for coordinating the positions of corresponding points of the elevation views relative to the vision lines; projecting members connected to and actuated by the arms for projecting said points from the vision lines onto the perspective area; and a pointer slidably engaging the projecting members and movable thereby to indicate the position of said points in the perspective view.

12. A perspectograph comprising a drawing surface having areas to receive elevation views of an object to be drawn in perspective and an area to receive a perspective view of said object, and provided with vision lines representing the intersections of horizontal and vertical planes of vision intersecting at right angles with the plane of the perspective view; arms pivoted at station points spaced from the vision lines and provided with pointers adjustable along the arms for projecting points of the elevation views onto the vision lines; scales mounted adjacent the surfaces of the elevation areas for coordinating the positions of corresponding points of the elevation views relative to the vision lines; projecting members connected to and actuated by the arms for projecting said points from the vision lines onto the perspective area; a pointer slidably engaging the projecting members and movable thereby to indicate the position of said points in the perspective view; and means for adjusting the positions of the station points relative to the drawing surface.

13. In a perspectograph, the combination with a drawing surface, of a pair of arms pivotally mounted at station points corresponding to the horizontal and vertical projections of a point of vision for projecting points onto lines representing the intersections of horizontal and vertical planes of vision intersecting with the picture plane of a perspective view to be drawn; and members connected to and actuated by the arms for projecting, by orthographic projection, the points from the lines to the picture plane to locate said points in the perspective.

14. In a perspectograph, the combination with a drawing surface, of a pair of arms pivotally mounted at station points corresponding to the horizontal and vertical projections of a point of vision for projecting points onto lines representing the intersections of horizontal and vertical planes of vision intersecting with the picture plane of a perspective view to be drawn; members connected to and actuated by the arms for projecting, by orthographic projection, the points from the lines to the picture plane to locate said points in the perspective; and a pointer connected to the projecting members and actuated thereby when said members are moved by the perspective projecting arms to indicate the position of a desired point in the perspective view.

15. In a perspectograph, the combination with a drawing surface, of a pair of station arms adjustably mounted adjacent the drawing surface; perspective projecting arms pivotally mounted at station points upon the ends of the station arms; a pointer mounted upon each perspective projecting arm and movable to various points of an elevation view to be projected; and means actuated by the perspective projecting arms for projecting in orthographic projection onto a picture plane, the projections of points projected by the said perspective projecting arms.

16. In a perspectograph, the combination with a drawing surface, of a pair of station arms adjustably mounted adjacent the drawing surface; perspective projecting arms pivotally mounted at station points upon the ends of the station arms; a pointer mounted upon each perspective projecting arm and movable to various points of an elevation view to be projected; means actuated by the perspective projecting arms for projecting, in orthographic projection, onto a picture plane, the projections of points projected by the said perspective projecting arms; and means for coordinating the points of different elevation views to determine the positions of corresponding points of said elevation views in a perspective view.

In witness whereof, I hereunto set my signature.

CARL W. ACKERBERG.